United States Patent
Schussler

Patent Number: 5,844,804
Date of Patent: Dec. 1, 1998

[54] CONFIGURABLE MACHINE-TOOL CONTROL

[75] Inventor: Ernest Schussler, Erlangen, Germany

[73] Assignee: Siemens Aktiengesellschaft, München, Germany

[21] Appl. No.: 918,984

[22] Filed: Jul. 23, 1992

[30] Foreign Application Priority Data

Jul. 26, 1991 [EP] European Pat. Off. ............ 91112618

[51] Int. Cl.⁶ .................................................. G05B 19/418
[52] U.S. Cl. ........................ 364/474.11; 364/474.22; 364/468.05
[58] Field of Search ............. 364/474.11, 474.01, 364/474.22, 474.23, 474.24, 474.25, 474.26, 474.27, 468.05, 468.06, 468.07, 468.08

[56] References Cited

U.S. PATENT DOCUMENTS 4,882,670  11/1989  Isobe et al. ............................. 364/188
4,887,220  12/1989  Kiya et al. ......................... 364/474.11

FOREIGN PATENT DOCUMENTS

| 0 233 949 | 9/1987 | European Pat. Off. . |
| 0 262 922 | 4/1988 | European Pat. Off. . |
| 0 298 396 | 1/1989 | European Pat. Off. . |
| 0 304 071 | 2/1989 | European Pat. Off. . |

*Primary Examiner*—Joseph Ruggiero
*Attorney, Agent, or Firm*—Kenyon & Kenyon

[57] ABSTRACT

A configurable machine-tool control is realized by a multitude of functional objects, whereby besides an optional operating element (BT), one functional object (01–022) consists of a procedure portion (PT) and a communication portion (KT), and can be realized either in software or in hardware and software. To provide a concrete defined variant of one machine-tool control, the required functional objects (01–022) can be combined from the quantity of all functional objects (01–022) into one or more processes (P1–P4).

2 Claims, 6 Drawing Sheets

CONFIGURABLE MACHINE-TOOL CONTROL

BACKGROUND OF THE INVENTION

To be used effectively, modern, numerically controlled control systems for machine tools must be able to cover a wide variety of manufacturing applications. The crucial technical requirements of manufacturing tasks are stored locally with the manufacturing tasks in a manner corresponding to the specific task. Thus, the ability to define the important components of a CNC (Configurable Numeric Control) system, in part, independent of one another is needed. These components include, for example, man-machine communication, inclusive of information editing, and information processing for controlling the machine tool. As a result, the technical effectiveness of a CNC system particularly configured for a defined manufacturing task is influenced by the relative weighting of the addressed components.

Conventional solutions for meeting the described demands included using specialized CNC controls, which are tailored in each case to the local manufacturing tasks, or using universal CNC control systems which are adapted by means of configuration parameters to the specific manufacturing task. This adaptation may be effected for example, by designing the software used for this purpose, for several technologies and then selecting one of these technologies through the setting of particular bits. In a broad field of manufacturing applications, combined forms of both conventional solutions arise. This generally leads to a heterogeneous system environment.

While the specialized CNC control, which is tailored to one manufacturing task, does in fact promote the effectiveness of the local information processing, it also substantially promotes system heterogeneity. As a result, the man-machine communication and the capability for integration suffers when there is a broad application field. The greater diversity of universal CNC systems inherently introduces heightened system complexity. When such a universal system is configured for only one manufacturing task, this complexity usually leads to a surplusage of functional capabilities which in turn, diminishes the local effectiveness of the system. Furthermore, the close linkage of the man-machine communication inclusive of information processing with the information processing via hierarchic tree structures is typical of the conventional solutions. Given a high degree of complexity, an increased investment of time and energy is required to comprehend these structures. When functions are to be expanded or new ones added, difficulties normally arise in such a system when these functions are merged into the existing system. These difficulties increase when the applied programming language becomes increasingly machine-oriented.

The present invention overcomes the problem of these two different control configurations, providing a machine-tool control which can be easily tailored to any application.

SUMMARY OF THE INVENTION

The present invention provides a configurable machine-tool control comprising several task-oriented units, at least one data processing system allocated to a task-oriented unit, and at least one functional object. The task-oriented units may include a numerical and a programmable controller, an operator unit, and a communication area unit with a network interface, for example. The functional object(s) can comprise either software or hardware and software and can execute at least one function capable of being allocated to one task-oriented unit. In any case, besides an optional operating element, each functional object has a procedure portion and a communication portion. The communication portion can relay messages between the procedure portion and other functional objects, and may include an object manager for managing at least two functional objects. Thus, by combining particular functional objects, a particular configuration of the machine-tool control is able to be realized.

This configurable machine-tool control permits a number of particular configurations of the man-machine communication, inclusive of information editing and information processing, as needed, and if necessary, these configurations are also independent of one another. Thus, the system as designed has a certain amount of flexibility. This flexibility permits goal-oriented definitions to be made to enhance technical effectiveness.

Therefore, a broad field of applications can be covered in a homogeneous system environment without surplusage functional capabilities. For this purpose, the realization of the machine-tool control may be represented as a logic model. In this logic model, the constituents of the machine-tool control are subdivided into task-oriented units. These task-oriented units are then converted into physical, defined elements in the form of hardware and/or software. In the concrete application case of a machine-tool control, the applied model distinguishes a dialogue and communication level, responsible for the man-machine communication, inclusive of information editing and the system-spanning communication, and distinguishes a design level, which comprises the numerical control and the machine interface control, that is essentially the information processing. The internal communication area serves as a connecting link between the addressed elements, which in their totality form a logical image of the control system.

The CNC system is physically defined based on this model depending on the requirements of the application, for example, in that the man-machine communication, numerical controller, and programmable controller areas are created as dedicated, modular processor units, or also only as processes. If the entire machine-tool control is only provided with one data processing system, or rather one processor unit, then according to an advantageous development of the present invention, all functional objects are united in one process managed by the data processing system (or the processor system).

If several data processing systems or processor units are present, then the functional objects can be combined into processes based on the efficiency of the data processing systems (or processor units) whereby one process is allocated to each data processing system, one object manager is allocated to each process having at least two functional objects, and whereby one interface is provided to enable switching between the processes or the object managers. Thus, optimally utilizing the prevailing data processing system or processor unit is possible.

According to another advantageous development, an operating element, which enables the functional object to be represented to the operator, can be allocated to the functional objects. In this manner, the operational structure of the machine-tool control can be optimally adapted to the needs of the user.

BRIEF DESCRIPTION OF THE DRAWINGS

An exemplified embodiment of the invention is depicted in the drawing and is clarified in greater detail in the following.

DETAILED DESCRIPTION

Figure 1:
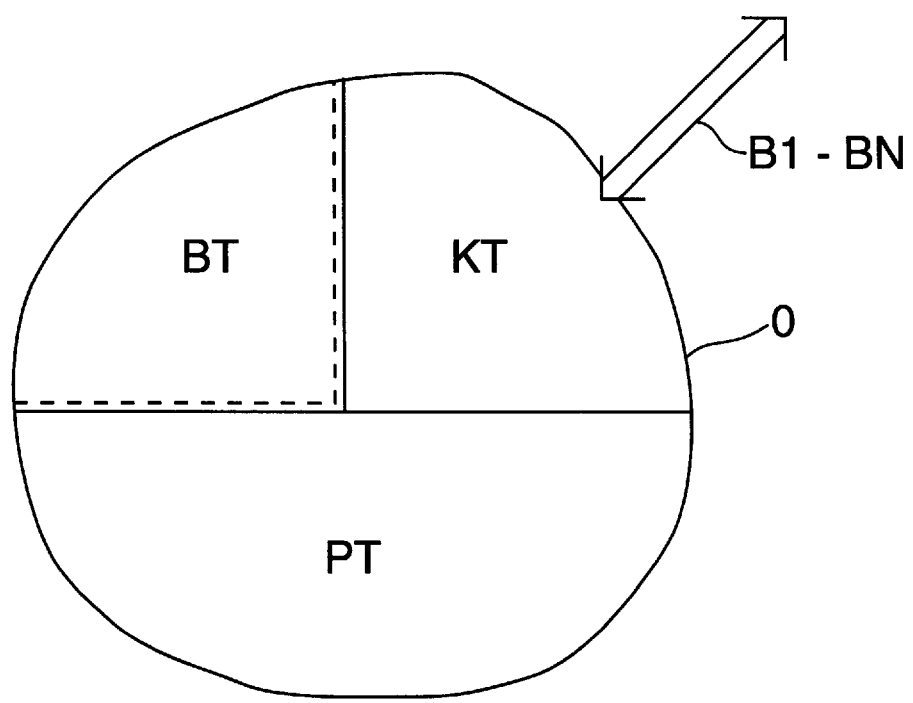
FIG. 1 illustrates a functional object.

FIG. 1 shows the structure, in principle, of a functional object which constitutes the basic building block for the configurable, numerical machine-tool control. Such a functional object comprises as software or a combination of software and hardware. Since the functional object initially does not have any concrete specific embodiment, it is depicted by a circle (like set theory notation) drawn by hand. The functional object is provided with a communication portion KT and a procedure portion PT, and optionally, with an operating element BT. The procedure portion PT can consist, for example, of a machine-oriented software procedure, which is responsible, for example, for one or more geometric calculations of the numerical controller. Alternately, since these calculations could be performed by a hardwired hardware logic, the procedure portion PT could consist of hardware. The communication portion KT controls the exchange of information between the procedure portion PT and the world external to the functional object O. The communication portion KT understands messages B1–BN transmitted to it by the outside world, as indicated by the double arrow. As a rule, the outside world includes communication portion KT of other functional objects O. In conventional data processing systems, these B1–BN messages are transmitted via a bus system when the functional objects O are separated locally. However, if several software objects are allocated to one process, for example, these objects can be filed in one storage device, and the messages can be exchanged within the process. The communication portion KT translates the messages B1–BN, which consist of so-called logical data or variables, into the most machine-oriented (i.e., lowest level) language that the procedure portion PT can understand. For its purpose as a means for facilitating the exchange of information between the procedure portion PT and the outside world, the communication portion KT only has to understand those messages B1–BN which, when translated, the procedure portion PT can also carry out. The number of messages B1–BN that the communication portion KT can understand depends the power of the procedure portion PT. Each functional object O recognizes and accepts the messages B1–BN arriving from the outside world that are intended to be received by it.

An object manager (see FIG. 3) is employed as an interface among the communication portions KT of the functional objects O. The object manager knows of all the objects, queries the messages B1–BN of the functional objects O, sends messages to them, and coordinates messages and, if indicated, synchronizes the message exchange.

Clearly all tasks of any machine-tool control whatsoever may be represented or performed with a multitude of functional objects O. For example, the machine-tool control can be used to control a simple lathe or can also comprise the control of a machining center. If, in the future, adding new tasks to existing tasks of a machine-tool control is desired, then merely creating, one or more additional functional objects is needed.

Figure 2:
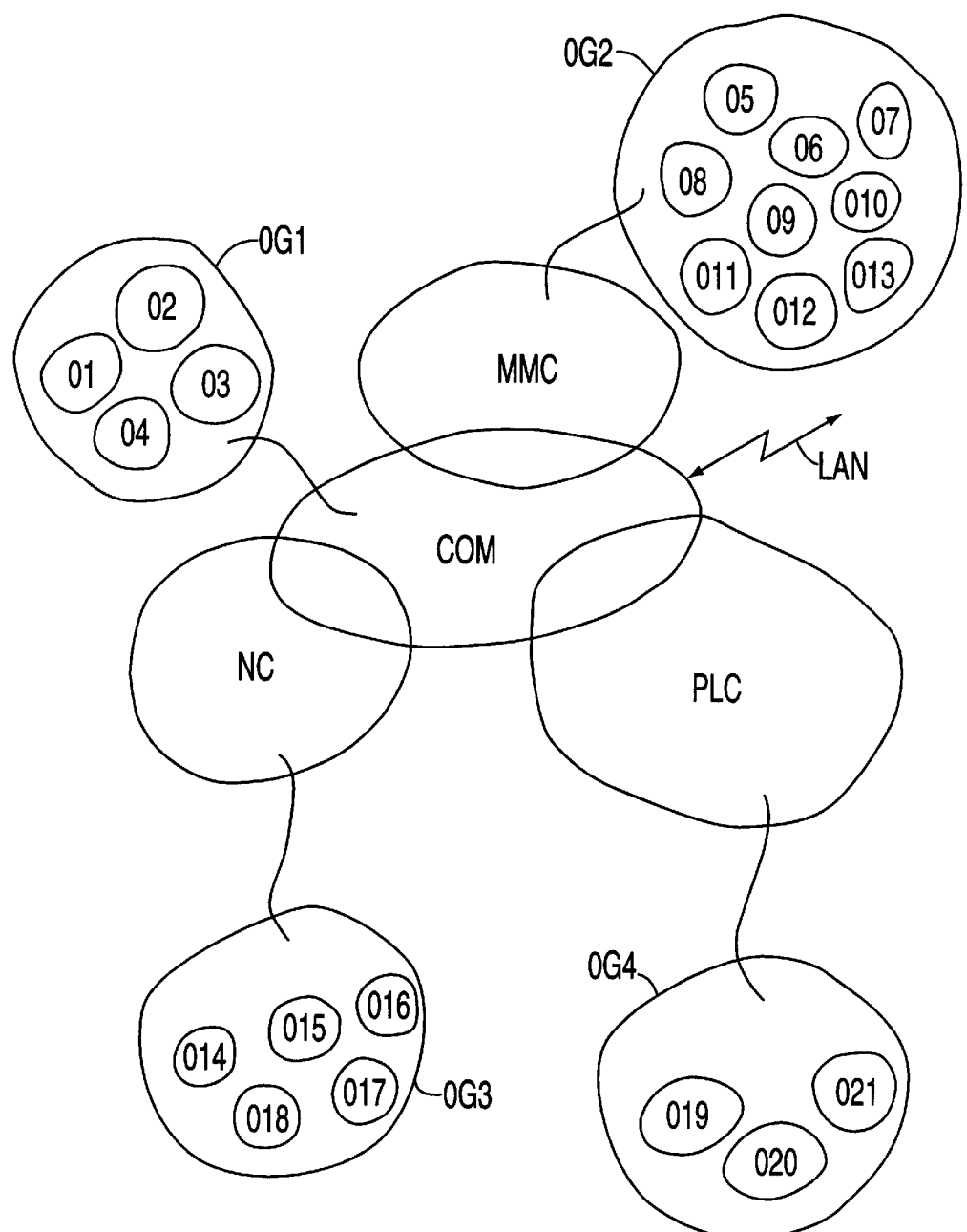
FIG. 2 illustrates functional objects allocated to task-oriented units.

FIG. 2 depicts functional objects 01–021 allocated to task-oriented units of a machine-tool control. For the purposes of this example, the functional objects 01–021 are supposed to be able to fulfill all conceivable tasks of a machine-tool control and are allocated to object groups OG1–OG4. The machine-tool control is broken down into units capable of being logically grouped, i.e., the units are task-oriented. These task-oriented units include the man-machine communication unit MMC, the communication area unit COM, the numerical control unit NC, and the programmable controller unit PLC. All functional objects 01–021 are divided into subsets. The subsets of functional objects are combined in the object groups OG1–OG4. The allocation of functional objects to subsets is initially undertaken in accordance with the task orientation to show that certain functional objects 01–021 or object groups OG1–OG4 are able to be allocated, as far as their function is concerned, to certain task-oriented units MMC, COM, NC, PLC. Thus, for example, the four functional objects 01–04 of the object group OG1 fulfill the tasks of the communication area unit COM, the functional objects 05–13 of the object group OG2 fulfill the tasks of the man-machine communication unit MMC, the functional objects 014 to 018 of the object group OG3 fulfill the tasks of the numerical control unit NC, and the functional objects 019–021 of the object group OG4 fulfill the tasks of the programmable controller unit PLC. This allocation is depicted in FIG. 2 by lines running from the object groups OG1–OG4 to the specific task-oriented units MMC, COM, NC, and PLC to clarify that the functional objects do not also have to be actually, i.e., locally, allocated to the task-oriented units.

Figure 3:
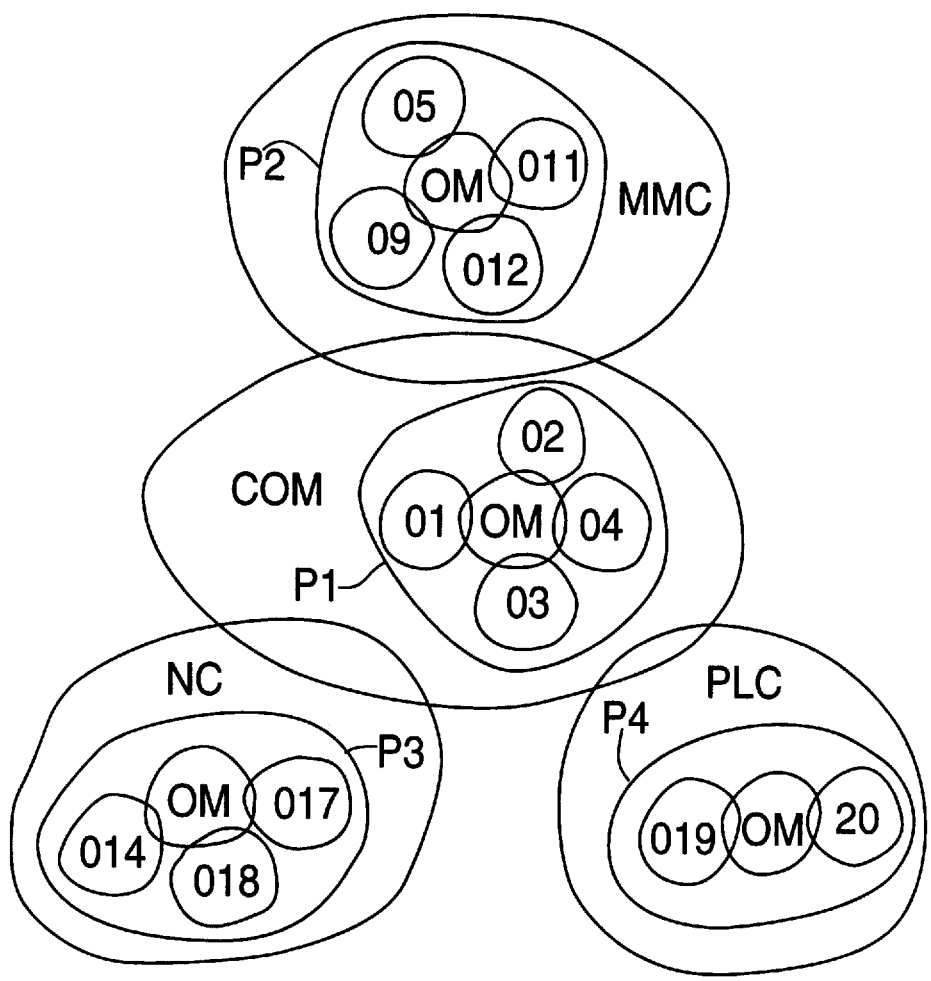
FIG. 3 illustrates an allocation of functional objects in a specific configuration of a machine tool.

FIG. 3 depicts a particular machine-tool control, which is configured by selecting functional objects from the totality of all functional objects 01–021. All functional objects 01 through 04 available to the communication area COM are combined into one process P1. The functional objects 05, 09, 011, and 012 for the man-machine communication are combined into one process P2. The functional objects 014, 017, and 018, for the numerical controller NC are united in one process P3. The objects 019 and 020 for the programmable controller PLC are united in a fourth process P4. The connection, or rather the communication of the functional objects among themselves is accomplished via the communication portions KT of the respective objects (as was described above referring to FIG. 1) and the prevailing object manager OM. Each process is provided with its object manager OM. The communication area COM represents the interface between the object managers of the task-oriented units MMC, PLC and NC. Before subdividing the functional objects into the process into P1, P2, P3, and P4, each task-oriented unit COM, MMC, NC, PLC must be provided with its, own data processing system, or rather its own processor unit, or a control unit, which can process the specific process P1, P2, P3, and P4.

In FIG. 3, the functional objects are divided into the processes P1–P4 such that each task-oriented unit COM, MMC, NC, and PLC has a functional object 01 . . . 020 allocated to it and the functional object is able to solve at least one task of the unit. However, when existing hardware configurations are used, for example, the various task-oriented units COM, MMC, NC, and PLC are sometimes provided with data processing systems or processor units that differ in efficiency. In such a case, the functional objects 01–021 can also be allocated differently. For example, if the numerical control unit NC had at its disposal a very efficient data processing system, it could then still manage the functional object 019 of the programmable controller PLC and, for example, the functional objects 05 and 09 of the man-machine communication unit. The functional objects 05, 09, and 019 would then be integrated into the process P3, as well. However, the communication division must be able to work under the prevailing operating system.

Conversely, expanding the functions of an existing numerical controller, or rather of its data processing system, may be desired even when the data processing system is already at the limit of its capacity. Therefore, if the data processing system of another task-oriented unit, for example of the man-machine communication unit, still has reserve capacity, or when installing a more efficient data processing system in the area of the man-machine communication is easier, this data processing system could still manage the functional objects of the man-machine communication and also perform tasks for the numerical controller. These do not necessarily have to be the functional objects being newly added to the numerical controller, but rather can also be functional objects previously managed by the numerical controller, when, for example, the functional objects being newly added would have to be directly allocated to the numerical controller for reasons of real-time processing.

Figure 4:
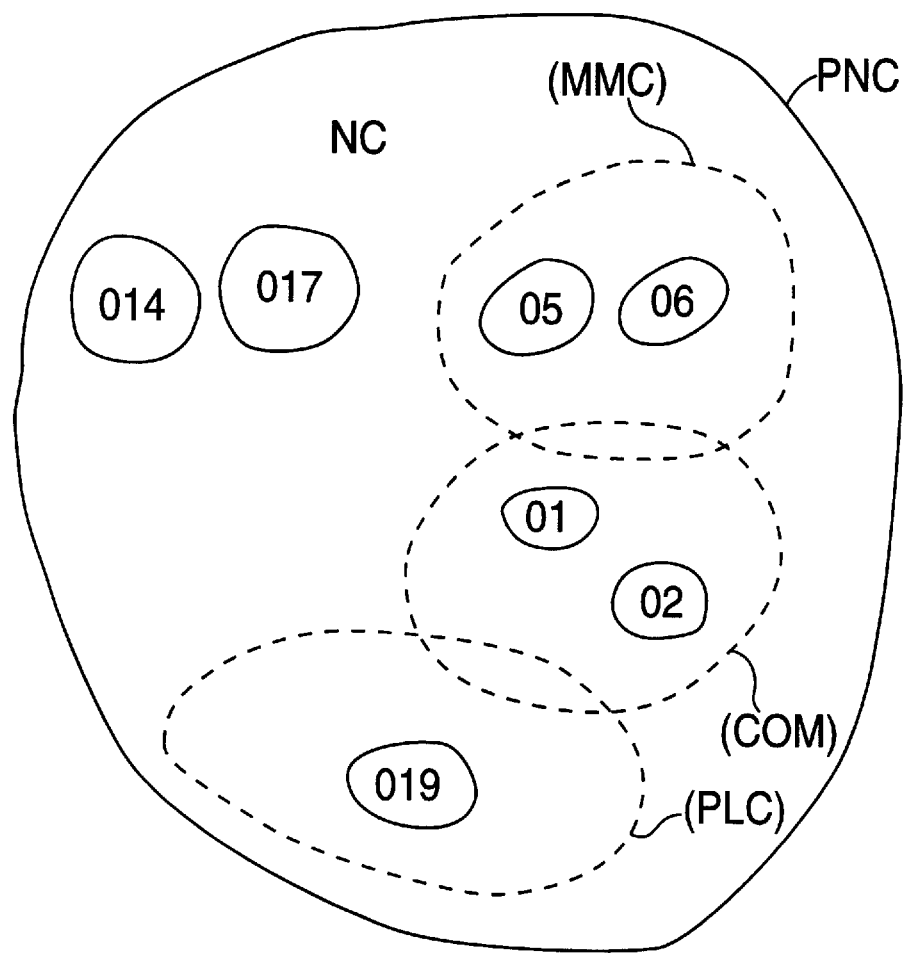
FIG. 4 illustrates a particular configuration of a machine-tool control having only one data processing system.

FIG. 4 depicts a configuration of a machine-tool control, where only the numerical controller NC is provided with a data processing installation. Such a relatively inexpensive machine control is realized with the functional objects 01, 02, 05, 014, 017, and 019, whereby the functional objects 01 and 02 perform the functions allocated to the communication area COM, the functional objects 05 and 06 perform the functions allocated to the man-machine communication MMC, the functional objects 014 and 017 perform the functions allocated to the numerical controller NC, and the functional object 019 performs the functions allocated to the programmable controller PLC. Since only the numerical controller NC is provided with a data processing system, all functional objects 01, 02, 05, 06, 014, 017, and 019 are combined in one process $P_{NC}$, so that the communication area COM, as well as the numerical control NC, the storage-programmable control PLC, and the man-machine communication MMC are serviced by the process $P_{NC}$. For the sake of clarity, the object manager OM of the process $P_{NC}$ is not shown.

Figure 5:
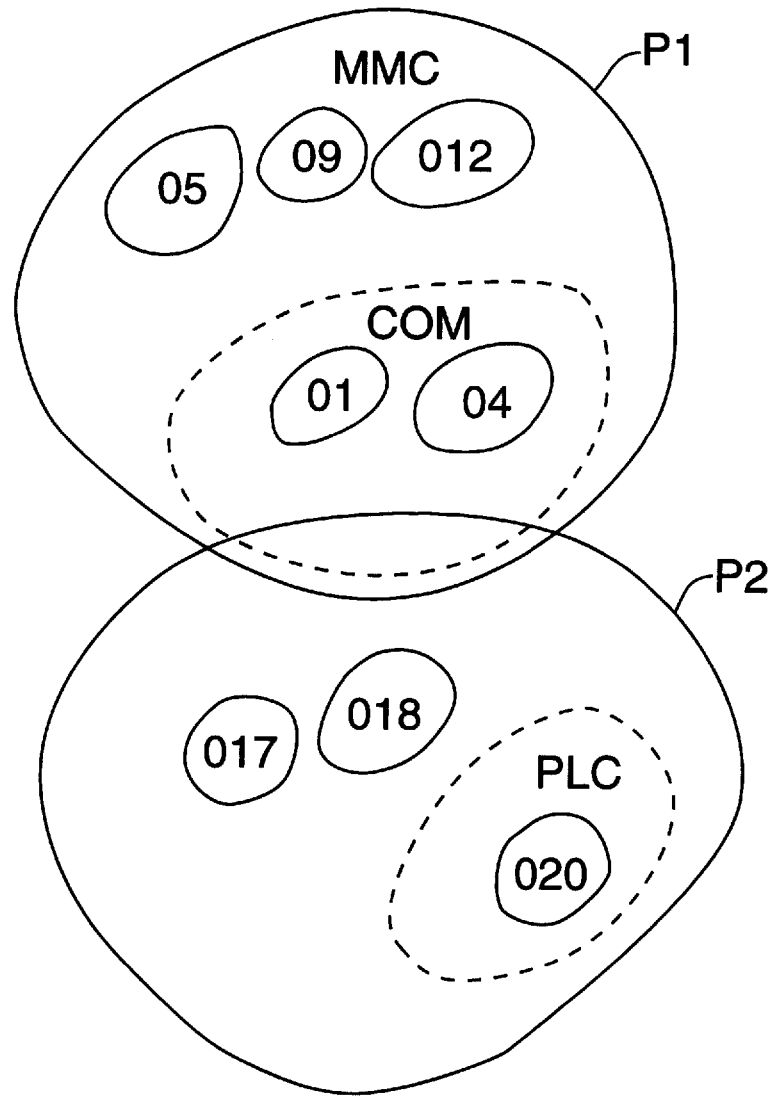
FIG. 5 illustrates a particular configuration of a machine-tool control having only two data processing systems.

FIG. 5 depicts a machine tool control configuration, in which the man-machine communication unit MMC and the numerical control unit NC are each provided with a data processing system. Here, two processes P1 and P2 are formed again, whereby the process P1 is handled by the data processing system of the man-machine communication unit MMC, and the process P2 is handled by the data processing system of the numerical control unit NC. The process P1 thereby comprises the functional units 05, 09, and 012, which carry out the functions allocated to the man-machine communication unit MMC, as well as the functional objects 01 and 04, which carry out the functions allocated to the communication area COM. The process P2 of the numerical control unit NC comprises the functional objects 017 and 018 allocated to the numerical control unit NC, as well as the functional object 020 allocated to the storage-programmable control unit PLC. The functional objects 01 and 04 of the communication area switch between the two processes P1 and P2.

Figure 6:
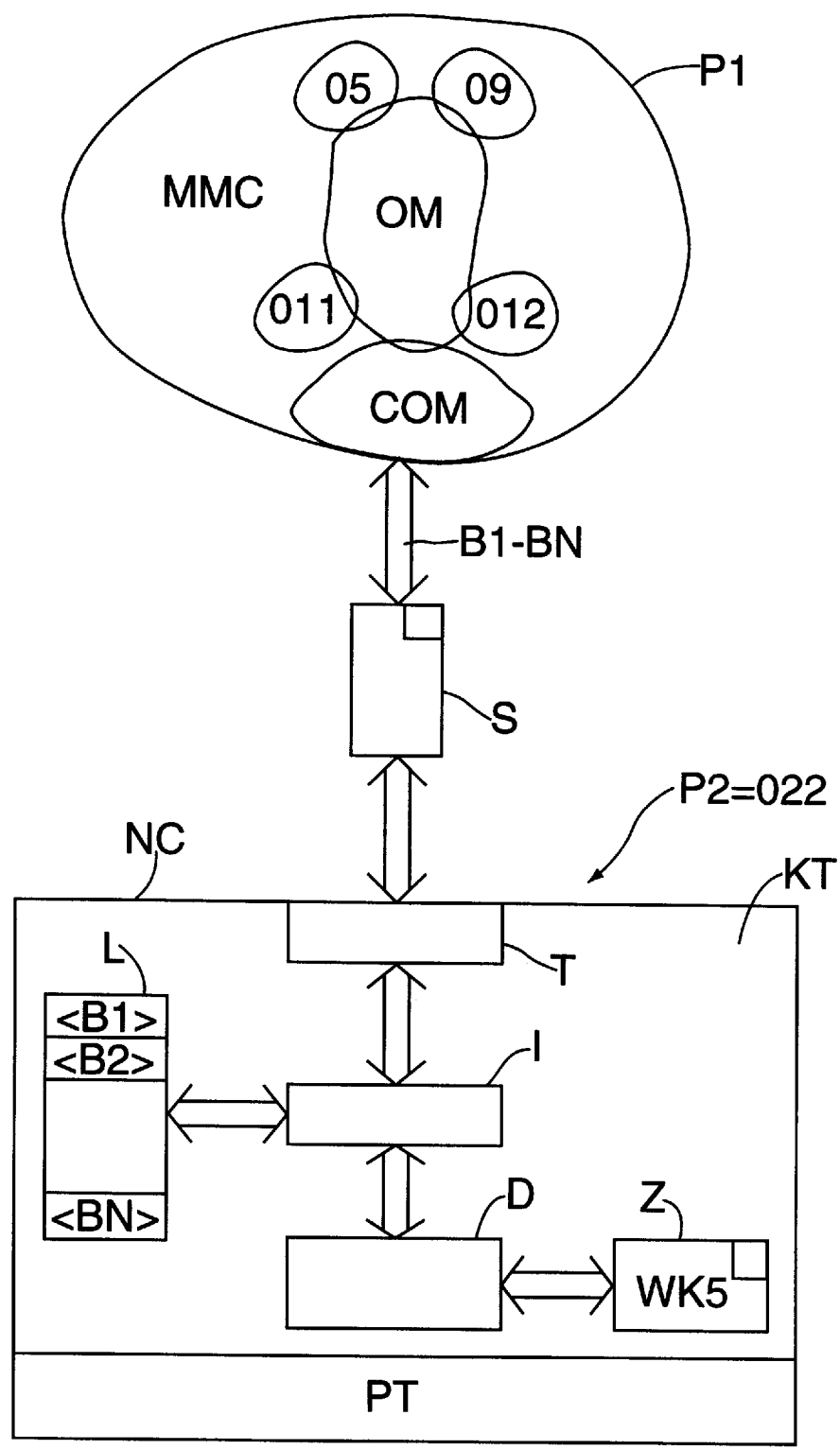
FIG. 6 illustrates a particular configuration of a machine-tool control based on conventional numerical controller.

FIG. 6 shows a specific configuration of a machine-tool control realized based on a numerical control that originally was not functional-object-oriented. The numerical control unit NC may be a conventional numerical control NC and is therefore represented in the form of a block diagram. At this point, an efficient man-machine communication unit MMC based on functional objects 01–021 is to be allocated to this conventional machine-tool control. Since the conventional machine-tool control is already able to carry out a multitude of procedures, the sum of these procedures can he regarded as a procedure portion P1 (see FIG. 1) of a functional object 022. To obtain a complete functional object 022, a communication portion KT and possibly an operating element BT must be allocated to the procedure portion PT, thus to the multitude of procedures of the conventional numerical control. In the exemplified embodiment according to FIG. 6, the communication portion KT is realized by a communication driver unit T, an interpreter I, a list L with coded messages B1–BN, as well as a data release unit. The communication driver T is connected to a storage device S, which can be a multiport RAM. The second input and output of the storage device S connects the communication area COM, which is allocated to the man-machine communication unit MMC. Allocated to the man-machine communication unit MMC are, furthermore, the functional objects 05, 09, 011, and 012, which can exchange messages among themselves and with the communication area COM by means of the object manager OM.

The communication area COM thereby recognizes all messages B1–BN allocated to an external unit, (in this case to the numerical control unit NC) and transfers these messages B1–BN to the multiport RAM S. The multiport RAM S, for example, is cyclically accessed by the communication driver T of the numerical control unit NC such that all incoming messages are routed via the driver T to the interpreter I. The machine-oriented data corresponding to the messages, which can be processed by the numerical control unit NC, are filed in the list L allocated to the interpreter I. This is symbolized by the pointed parentheses containing the reference symbols for the messages B1–BN. The data belonging to the message B1–BN in question is read by the interpreter from the list L and routed to the data release unit D. A specific storage cell Z, which contains the value queried via the particular message, is then addressed by means of this data. This value, in the example the tool correction WK5, is written, via the data release unit D, the interpreter I, and the driver T, into at storage cell of the multiport RAM S. This data can then be accessed by the communication area COM and be transmitted as a message B1–BN to the communication portion KT of the respective functional object 05, 09, 011, or 012.

What is claimed is:

1. A configurable machine-tool control comprising:
   a) a plurality of task-oriented units;
   b) a data processing system allocated to one of said plurality of task oriented units;
   c) a plurality of functional objects, each of said plurality of functional objects
      i) executing at least one function,
      ii) being allocated to one of said plurality of task-oriented units based on said at least one function, and
      iii) having a procedure portion and a communication portion, said communication portion adapted to relay messages between said procedure portion and at least one other of said plurality of functional objects;
   d) an object manager, said object manager managing at least two of said plurality of functional objects; and
   e) a communication area,
   wherein at least two of said plurality of task-oriented units include a data processing system having a level of efficiency and performing a process, wherein said plurality of functional objects are allocated to said at least two of said plurality of task-oriented units based on the level of efficiency of the data processing systems, wherein at least one object manager is allocated to each process that has at least two functional objects allocated to it, and wherein said communication area acts as a data conduit between said processes, whereby a particular configuration of the configurable machine-tool control is defined by the allocation of said plurality of functional objects among said plurality of task-oriented units.

2. The configurable machine-tool control of claim 1 wherein when there are more than one object managers, said communication area provides a communication channel between said object managers.

* * * * *